Feb. 2, 1932.   H. W. INGLE   1,843,160
GLASS BLOWING MACHINE AND METHOD
Filed Oct. 14, 1924   9 Sheets-Sheet 3

Fig. 3.

Witness
N. E. Blake

Inventor
Henry W. Ingle
by W. H. Houss
Att'y.

Feb. 2, 1932.   H. W. INGLE   1,843,160
GLASS BLOWING MACHINE AND METHOD
Filed Oct. 14, 1924   9 Sheets-Sheet 4

Inventor
Henry W Ingle
by W H Honiss
Att'y.

Feb. 2, 1932.   H. W. INGLE   1,843,160
GLASS BLOWING MACHINE AND METHOD
Filed Oct. 14, 1924   9 Sheets-Sheet 5

Witness
N. E. Blake

Inventor
Henry W. Ingle
by W. H. Howss
Att'y

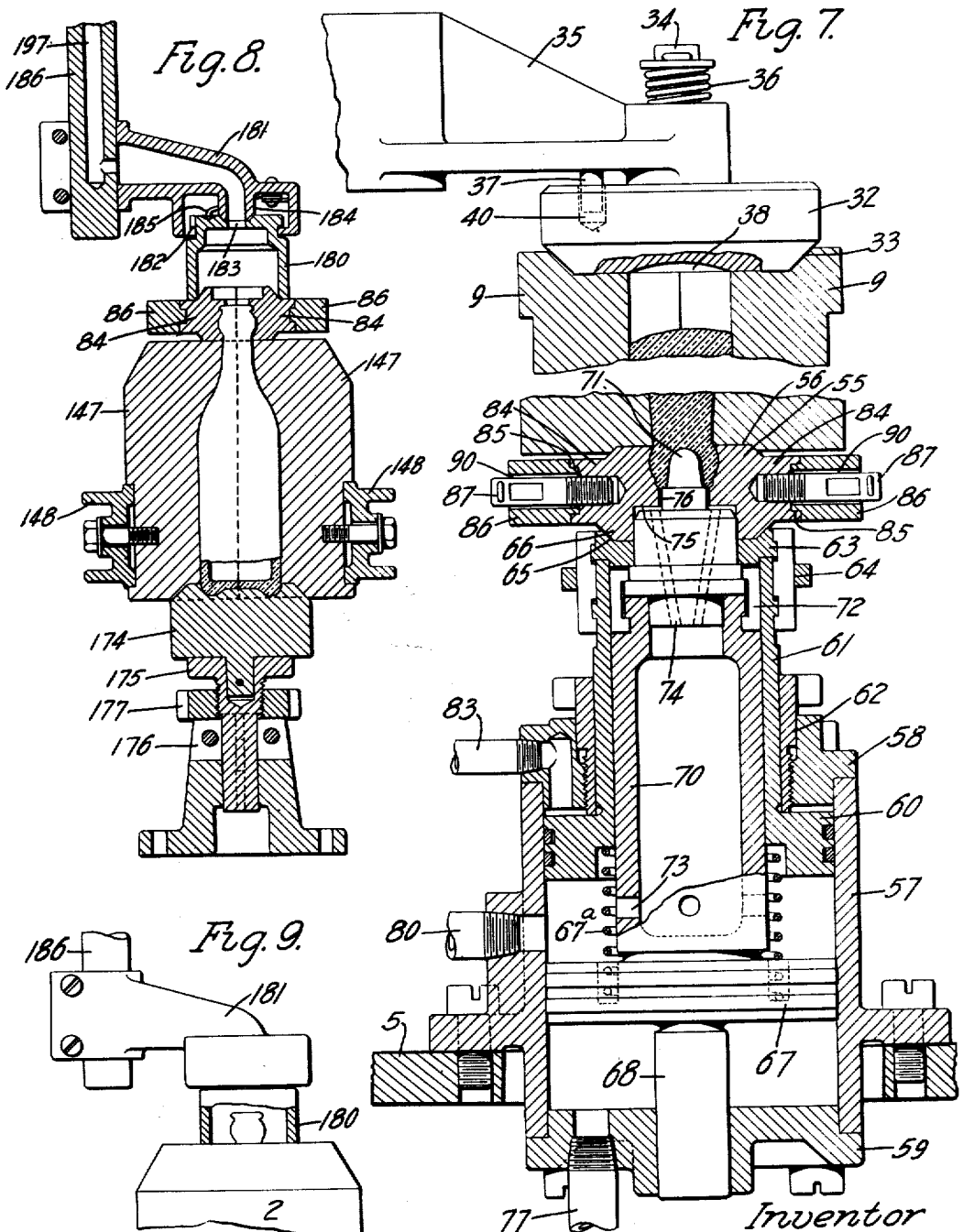

Feb. 2, 1932.     H. W. INGLE     1,843,160
GLASS BLOWING MACHINE AND METHOD
Filed Oct. 14, 1924     9 Sheets-Sheet 7

Witness.
N. E. Blake

Inventor
Henry W. Ingle
by W H Honiss
Att'y.

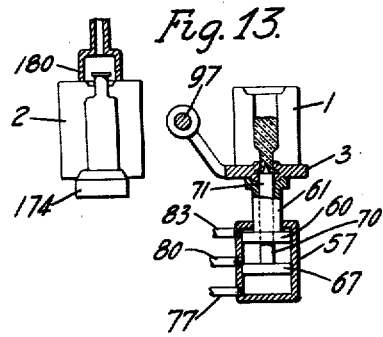
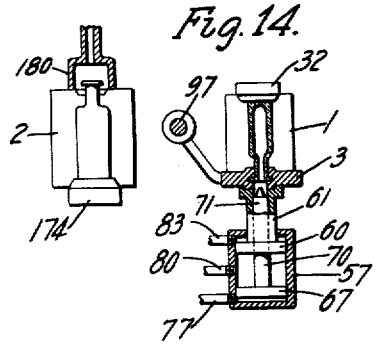
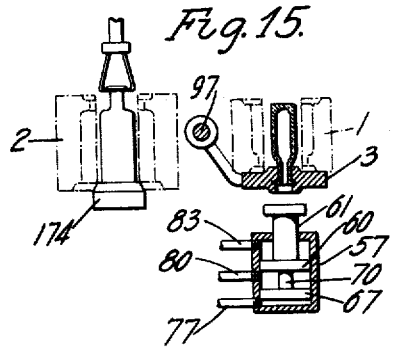
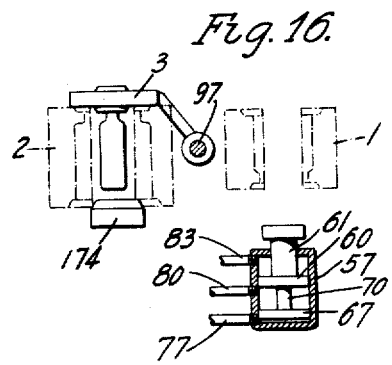
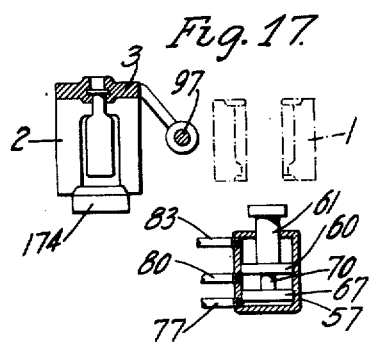
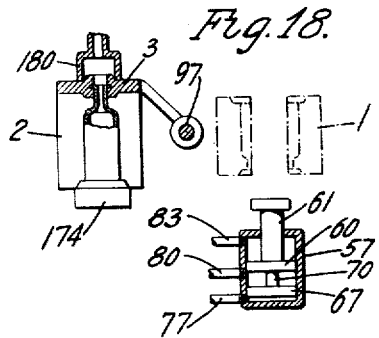
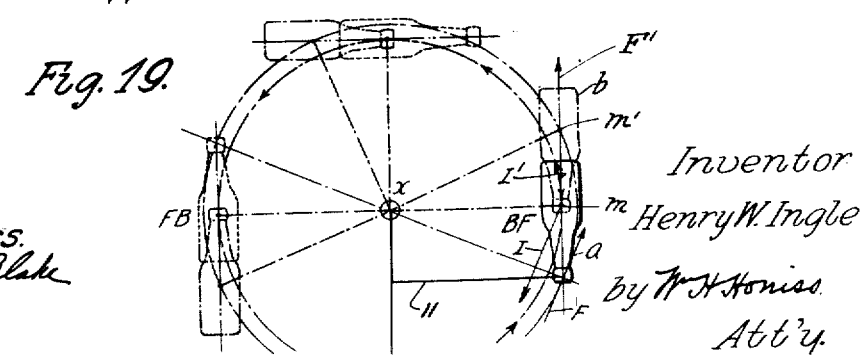

Feb. 2, 1932.  H. W. INGLE  1,843,160
GLASS BLOWING MACHINE AND METHOD
Filed Oct. 14, 1924   9 Sheets-Sheet 9
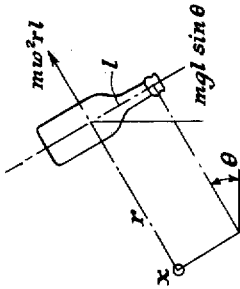
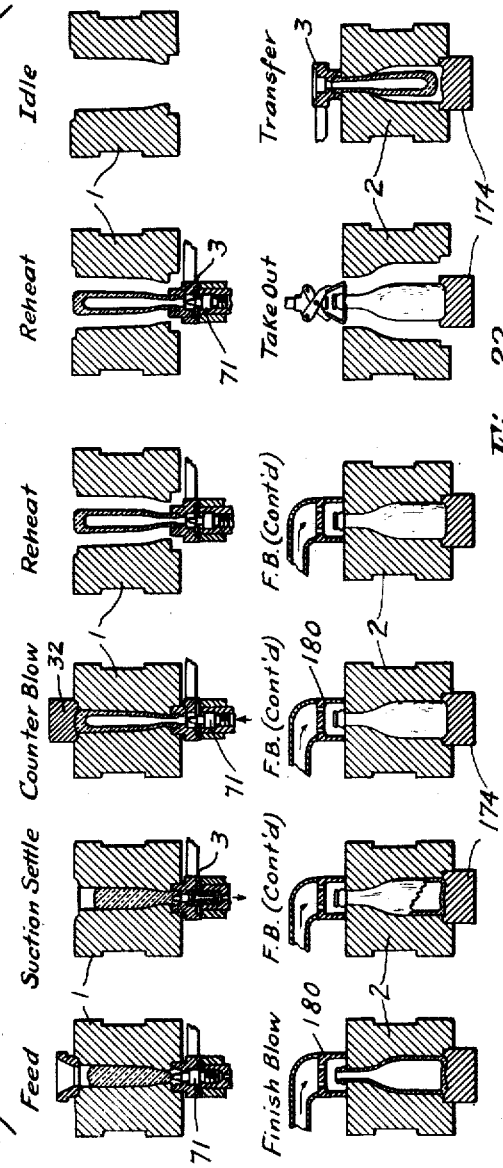
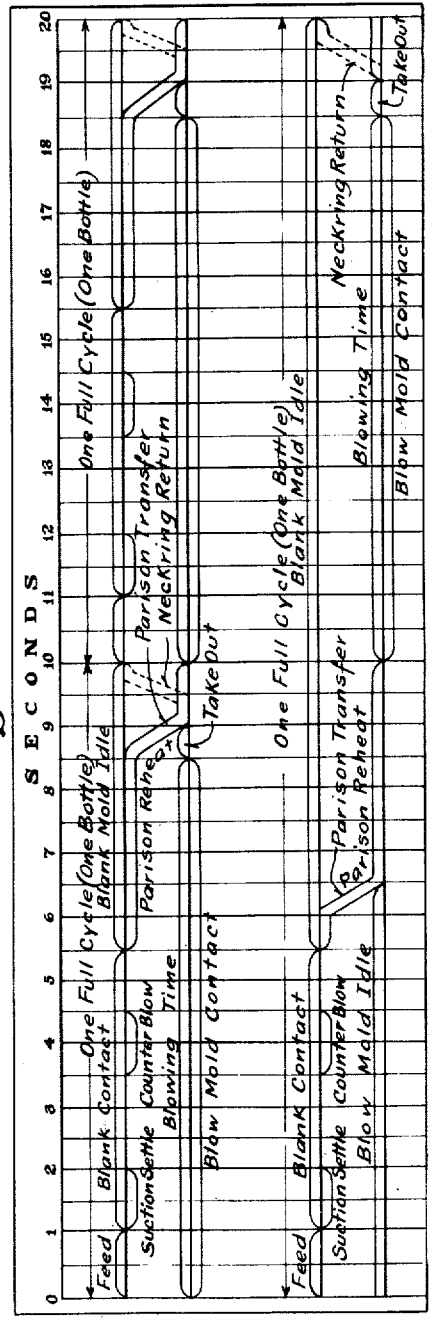
Inventor
Henry W. Ingle
by *W H Honiss*
Attorney.

Patented Feb. 2, 1932

1,843,160

UNITED STATES PATENT OFFICE

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE

GLASS BLOWING MACHINE AND METHOD

Application filed October 14, 1924. Serial No. 743,531.

This invention relates to the manufacture of glassware, and it has particular relation to the production of blown glassware by the system in which blanks or parisons are formed in blank molds, are transferred to finishing molds, and are there blown into final shape.

One of the primary objects of the invention is to provide a method and apparatus for blowing glassware, wherein a plurality of machine sections are fed with mold charges from a single feeding source and wherein each section includes a pair of molds, consisting of an inverted blank mold and an upright blow mold or finishing mold. Each pair of molds is mounted and operated independently of the other pairs of molds, the blank molds and blow molds of each pair are fixed permanently at the charge-receiving and finish-blowing stations respectively, and an oscillating transfer device is mounted between the molds of each pair for transferring blanks from the blank mold to the blow mold.

Another object of the invention is to provide a machine comprising a plurality of independently operating individual sections of the above indicated character, in which the cycle of operations performed upon the glass by each pair of molds may be varied within wide limits determined by the operation of the molds concurrently as one extreme and the operation thereof successively as the other extreme, independently of the other sections of the machine, and in which the various operations performed by each section may also be varied with respect to one another so as to cause each individual section to suit the needs of the particular kind of ware that is made by that section.

A further object of the invention is to provide a method and apparatus for blowing glassware in which improved temperature control is secured by utilizing relatively heavy molds. I accomplish this result by mounting all of the molds in stationary positions. Such stationary molds may be made much more massive than molds which are mounted either singly or in multiple upon moving mold tables, as is the usual practice.

A still further object of the invention is to provide an apparatus for blowing glassware in which the molds and the parts cooperating therewith are mounted rigidly, solidly and with a minimum number of moving parts, thereby obtaining better registration and cooperation between the engaging parts of the apparatus.

A still further object of the invention is to provide a system for blowing glassware in which the molds are capable of producing a larger quantity of ware than can be produced in ordinary machines of the rotary type, thereby reducing the number of molds required for a given output, or increasing the output for a given number of molds.

A still further object of the invention is to provide apparatus of the character described, embodying a plurality of individual glass shaping machines or sections, having a delivery trough mechanism which is adapted to successively deliver mold charges thereto in timed sequence from a single glass feeding device.

A still further object of the invention is to provide a machine of the character described, in which the blanks or parisons are transferred from a blank forming station to a finish blowing station by a neck ring oscillating between these stations and offset with respect to its axis of swinging movement, with the longitudinal axis of the blank disposed substantially tangentially to the arc described by the center of gravity of the blank, thereby to a great extent avoiding or counteracting the tendency of centrifugal action to bend or otherwise distort the shape of the blank during the transferring operation and rendering possible an increased operating speed.

A still further object of the invention is to provide an apparatus of the above indicated character, in which the movements of the several parts shall be effected independently of each other through the medium of separate valve-controlled fluid pressure means, whereby the mechanism is simplified, as compared with the glass blowing machines heretofore used, and which shall embody independently adjustable valve-actuating devices for operating the several valves in proper sequence and also in proper timed relation with the operation of the respective sections, and with their common feeding device.

Bottles and other blown glass articles are made in a great variety of sizes and shapes. For each style or shape of glassware there is an ideal cycle of operations between the time when a mold charge is deposited in the parison mold and the time when the finished ware is removed from the blow mold. Some kinds of ware are best made by allowing the parison to remain in the parison mold for a relatively short time and to remain in the blow mold for a relatively longer time. For other styles or shapes of ware, the parison should remain in the parison mold for a longer time in order to produce a thicker skin or enamel on its walls. It is also desirable to vary the timing and duration of various other operations performed on the glass, such as settling in the parison mold to form the neck finish, counter-blowing in the parison mold, and the application of air pressure in the finishing mold, and the best ware is produced when each one of these several operations is given its most effective timing and duration in the general cycle of operations.

Machines having a series of molds, moving either constantly or intermittently, as now commonly employed for making bottles and other forms of blown glassware, afford only a limited range of variation in the timing and duration of the several operations mentioned above, by reason of the fact that a number of pairs of molds, each pair consisting of a blank mold and a blow mold, are mounted on tables travelling either constantly or intermittently, and the successive operations must be performed on the glass at definite zones or stations in their travel. In such machines there is necessarily a fixed time interval between the arrival of the glass at one zone or station and its arrival at the next zone or station, for example, between the transfer zone or station, where the glass is transferred from the blank mold to the finishing mold, and the next zone or station where the finish blowing may be effected. In such machines this time control is necessarily fixed according to the type and speed of the machine. Similarly the duration of the operations of mold-charging, settle-blowing, counter-blowing, transfer, finish-blowing, and taking-out, and the time intervals between these operations, are fixed. If the duration and time intervals are proportioned correctly for one style or thickness of ware, they are only approximately correct for a different style or thickness of ware. On account of this relatively fixed cycle of operations imposed by the nature of the rotary or travelling machine, such a machine operates at its maximum efficiency only upon one style or thickness of ware and when all of its molds are making that same style or thickness of ware. In making all other styles or thicknesses of ware, or in making different styles or thicknesses in its different molds at the same time, it is necessarily more or less inefficient.

The present invention avoids the inflexibility of rotary or other travelling machines, as to the allocation of the cycle of operations as to the several steps of the process, by providing for the correct apportioning of the steps of the fabricating process. In addition, this machine is given still greater flexibility and greater capacity for individual adjustment of the cycles of its molds, by separating each pair of molds from every other pair, and enabling each mold of each pair of molds to have its independent cycle of operations adapted for the particular kind of ware that is being made by that pair of molds.

A complete installation consists of a plurality of these sections, and a common feeding apparatus is employed for delivering mold charges to the several sections in proper succession. On account of the division of the machine into individual and independently operating sections, this machine is termed an "individual section" machine.

The independent adjustability of the sections of this machine makes it well adapted for the production of a variety of small quantities of ware of different shapes and sizes. Glass factories have much difficulty in filling small orders for ware of different kinds, and it is usually the practice in such instances to either produce the ware by hand or to equip a large automatic machine with a plurality of differently shaped molds capable of producing ware of the desired varying shapes. In the latter case, certain disadvantages are encountered, one of the most serious of which is that if it should become necessary to stop the machine in order to either adjust or repair any one of the different molds, or to change the molds as orders of a certain shape are completed, the entire production is temporarily interrupted. Also the machine is capable of producing perfectly only one of the several styles of ware which it may be called upon to produce simultaneously, and the other styles are often so imperfect that they must be discarded.

In the present machine, these disadvantages are all avoided, as will more fully appear below. Also, the present machine provides an expansible system in which any desired number of sections may be set up side by side in a line which may be straight, or curved to suit the contour of the melting furnace with which they are used. Any one of the sections may be added or removed at any time and the operation of any section may be discontinued or renewed at any time.

Further objects of the invention include such novel features of construction and arrangement as are disclosed in the accompanying specification and drawings, in which Figure 1 is a side elevational view of a glass-working apparatus constructed in accordance with the invention, certain parts being omitted and certain other parts being shown in section;

Fig. 3 is a piping diagram of one section of the apparatus;

Fig. 7 is an enlarged sectional elevational view through the blank mold and the mechanism which actuates the neck plunger and plunger ring, the section being taken on line 7—7 of Figs. 4 and 5;

Fig. 8 is a similar view on a smaller scale taken on line 8—8 of Fig. 5, illustrating the blow mold and the bottom plate and blow head thereof;

Fig. 9 is a fragmentary view illustrating the blow head in contact with the blow mold for blowing the bottle to final form after it has been released by the neck ring;

Figure 1:
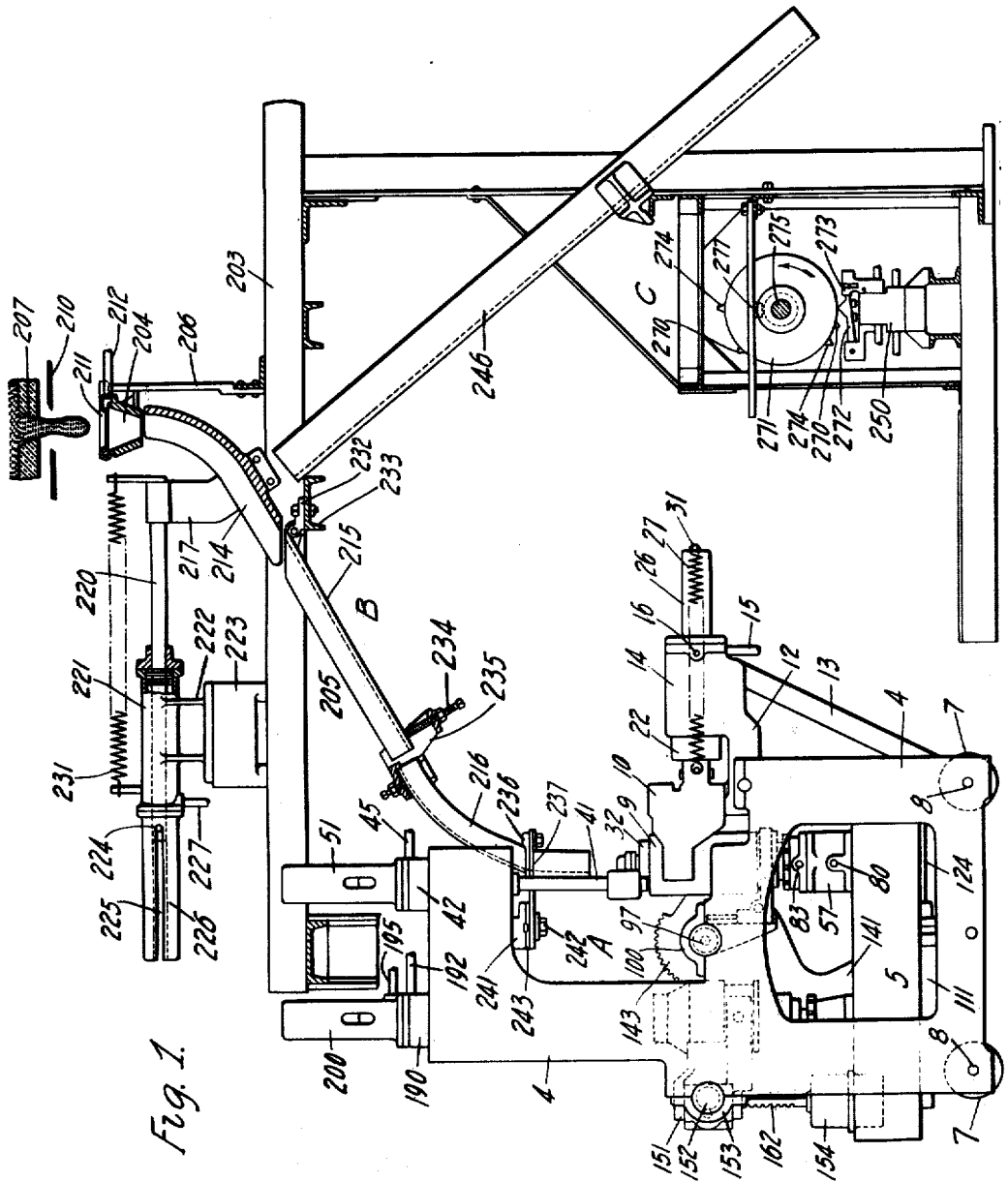

Figs. 13 to 18 inclusive are diagrammatic views illustrating the various positions occupied by the blank mold and the blow mold and the sequence of operation thereof;

Fig. 19 is a composite diagrammatic view illustrating the present method of transferring a blank from a blank-forming station to a finish-blowing station, in comparison with the old method of transferring a blank between these stations;

Fig. 20 is a diagrammatic view illustrating a parison being transferred from a neck-down position at a blank forming station to a neck-up position at a finish blowing station in a position in which the centrifugal force balances gravitational force;

Fig. 21 is a diagrammatic view illustrating the concurrent or overlapping operation of the blank and blow mold cycles; and Fig. 22 is a comparative chart illustrating the range through which the operations of the machine may be shifted, the upper chart showing the operation of the blank and blow mold cycles concurrently as one extreme, and the lower chart showing the operation of these cycles successively.

A glass working apparatus embodying the present invention is illustrated in general as comprising a plurality, four in this instance, of shaping machines or individual sections A (Figs. 1 and 2), each section embodying a single stationary blank mold, a single stationary blow mold, and a neck ring mounted to oscillate between these molds to transfer a blank from the former to the latter, each of said machines being capable of independently performing a complete molding operation; a delivery mechanism B for successively supplying the several shaping machines with mold charges of predetermined size and shape from a single glass feeding device; and a pressure control mechanism C for adjustably regulating the application of the operating fluid pressures of the several shaping machines and those of the delivery instrumentalities, and also the application of the different blowing pressures and the settling suction, in proper sequence and in timed relation with respect to each other and to the operation of the feeding device. These several mechanisms will be described in the order mentioned above.

*Shaping machine*

The shaping machines A are arranged in multiple, and in the present instance are secured together in side-by-side relation in any convenient manner (Fig. 2), although it may be desirable to mount these machines upon a rotatable table or turret. With particular reference to Figs. 13 to 18, each of the machines or sections embodies a blank mold 1 which is disposed in a permanently inverted position at the blank-forming station, a blow mold 2 which is permanently disposed in a neck-up position at the finish-blowing station, and a neck ring 3 which is adapted to swing about a horizontal axis from the blank-forming station (Fig. 15) to the finish-blowing station (Fig. 16) to transfer a blank from the blank mold to the blow mold, thereby positioning the parison at the finish-blowing station in a neck-up position. According to the present invention, the neck ring effects the transfer of the parison from the blank-forming station to the finish-blowing station, in contrast to the machine disclosed in my companion application, Serial No. 735,079, filed Aug. 30, 1924, in which such transfer is effected through the medium of the blow mold.

Figure 4:
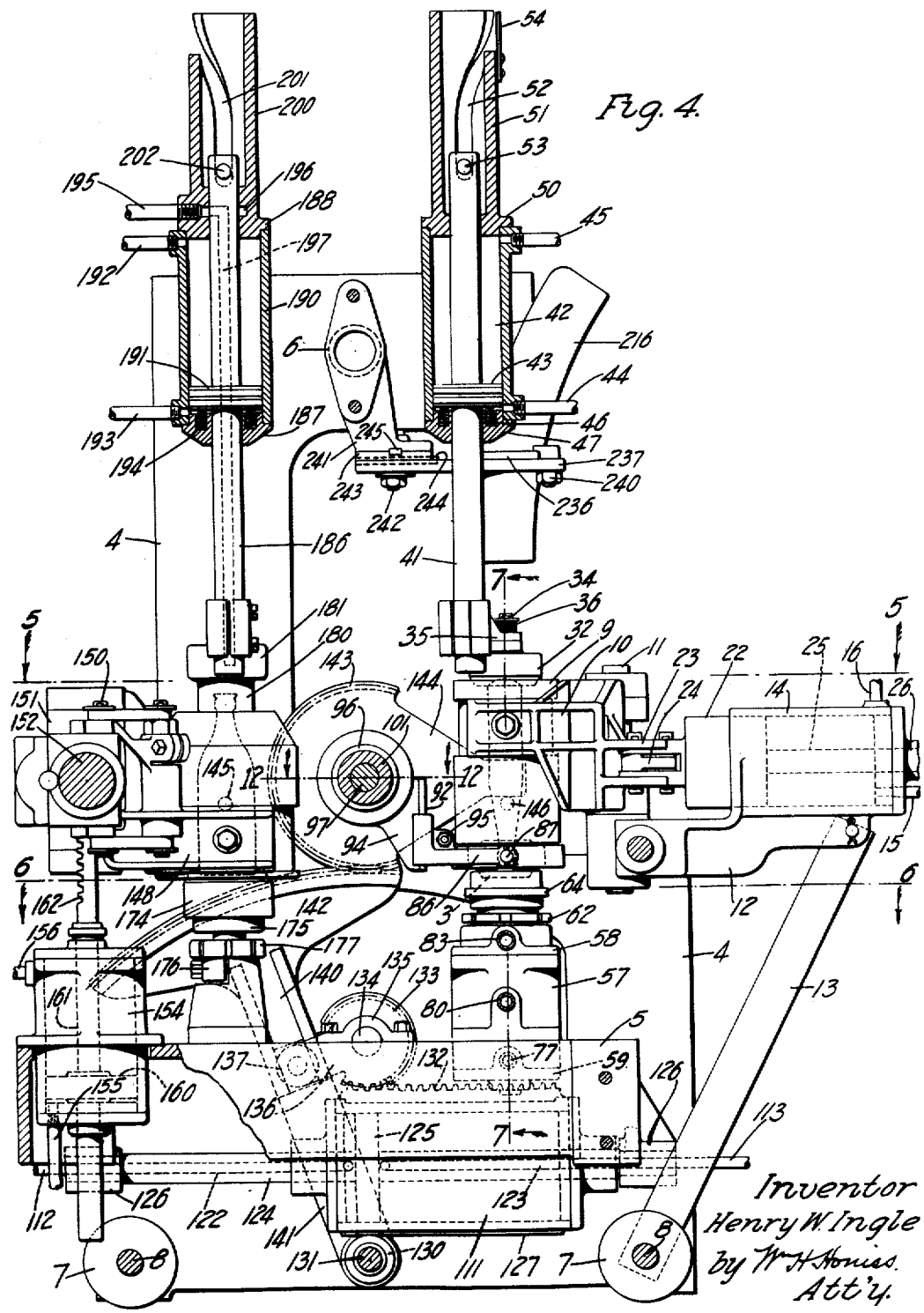
Fig. 4 is a side elevational view of one of the shaping machines or sections, certain parts being shown in section on the line 4—4 of Fig. 5.

The molds 1 and 2 and the oscillating neck ring 3 are carried by a structure consisting of side frames 4, which are secured together adjacent to their lower portions by a base member 5, and at their upper ends by a tubular brace 6. This structure is mounted upon wheels or rollers 7 on axles 8 carried by the side frames 4 (Figs. 1 and 4).

Figure 5:
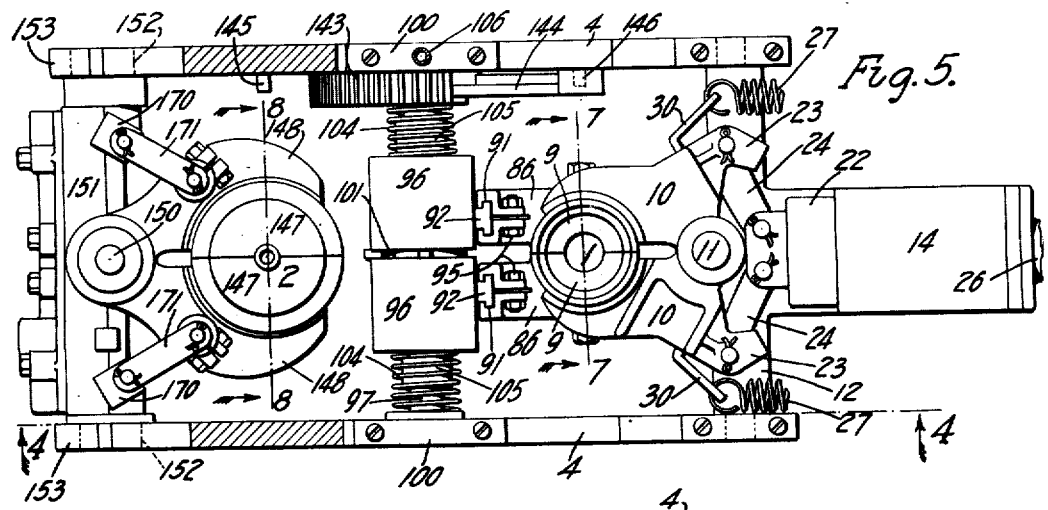
Fig. 5 is a plan view of one of the shaping machines, with parts in section on line 5—5 of Fig. 4, illustrating the relative position of the blank mold and the blow mold.
Figure 6:
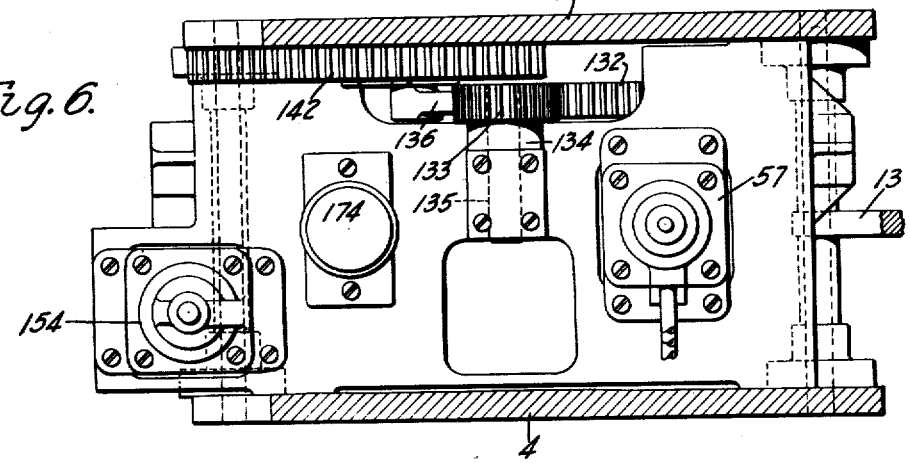
Fig. 6 is a plan view of one of the shaping machines, with parts in section on line 6—6 of Fig. 4, illustrating the relative positions of the bottom plates and the inverting mechanism of the blow molds.

Each blank or parison mold 1 comprises two sections 9 which are detachably secured to mold holders 10 (Figs. 5 and 7). The holders 10 are hinged upon a pin 11 which is carried by a bracket 12, supported by the side frames 4 and by a brace 13.

The mold sections 9 are closed by means of fluid pressure, which is admitted to a cylinder 14, and exhausted therefrom through pipes 15 and 16 respectively, which communicate with a pipe 17 (Fig. 3). The pipe 15 is provided with a regulating valve 18 by means of which the flow of pressure delivered to the cylinder may be controlled as desired. The pipes 15 and 16 are provided with check valves 20 and 21 respectively. By means of this arrangement of valves, a gradual pressure may be exerted through the pipe 15 in order to close the blank mold, and a rapid exhaust may be obtained through the pipe 16 to permit the mold to be opened quickly. The cylinder 14 is also carried by the bracket 12, and is provided with a piston 22 which is connected by means of links 24 to arms 23 formed on the mold holders 10. The piston 22 is provided with a rearwardly extending piston rod 25, which is slidably supported in a tubular housing 26 fixed to the rear head of the cylinder 14.

The blank mold is opened, when the pressure in the cylinder 14 is exhausted, by springs 27, which are connected at their forward ends to arms 30 (Fig. 5), provided on the mold holders 10, and are attached at their rearward ends to a cross bar 31 carried by the tubular housing 26 (Fig. 1).

The upper portion of the blank mold, as viewed in the several drawings, is closed by a cover or baffle plate 32, which is shaped to seat within complementary depressions 33 formed on the mold sections 9 (Fig. 7) and has a depression 38 formed therein. This cover plate is provided with a pin 34, which extends loosely through an opening in an arm 35, and is yieldably maintained in position therein by a spring 36. This construction permits the cover plate 32 to move laterally to a limited extent to insure accurate contact when the cover plate is moved to close the blank mold. A pin 37 is provided on the arm 35 for loose engagement with a recess 40 formed on the cover plate 32, and prevents the latter from rotating on the pin 34 and becoming angularly displaced with respect to the blank mold in instances where the latter is shaped to form blanks, the bottoms of which are other than circular.

The arm 35, which supports the cover plate 32, is adjustably secured to the lower end of a vertically reciprocable piston rod 41, which extends upwardly through a fluid pressure cylinder 42 and is provided with a piston 43 (Fig. 4). The cylinder 42 is suitably secured to one of the side frames 4 and is supplied with fluid under pressure through pipes 44 and 45, in order to raise and lower the cover plate 32 with respect to the blank mold. Frictional contact between the cover plate 32 and the sections of the mold is avoided, when the latter are opened and closed, by means of a plurality of springs 46, which are suitably seated in the lower head 47 of the cylinder 42 and which resiliently support the piston 43 when the pressure above the same is relieved during such periods. These springs elevate the piston 43 a sufficient distance to provide clearance between the mold sections 9 and the cover plate 32.

The upper portion of the piston rod 41 extends through and is slidably mounted in an upper cylinder head 50, which is formed with an upwardly extending tubular casing 51. The casing 51 functions as a protective housing for the upper portion of the piston rod 41, and is provided with a helical slot 52 into which projects a pin 53, carried by the piston rod 41. As the piston 43 ascends, under the influence of fluid pressure admitted to the lower end of the cylinder 42, in order to elevate the cover plate 32, the slot 52, acting on the pin 53, imparts a partial rotation to the rod 41 that is sufficient to swing the cover plate 32 in a lateral direction and out of the path of the oscillating neck ring 3, the construction and operation of which will be hereinafter described. Upon the downward stroke of the piston 43, the cover plate is returned to its closing position over the blank mold. A latch spring 54, of suitable construction, is provided on the side of the casing 51 and is adapted to engage the pin 53 and prevent the piston, and parts carried thereby, from falling in the event that the pressure is cut off or fails when the piston occupies a raised position.

During the charging and blank-forming operations, the neck ring 3 occupies a position directly beneath and contiguous with the blank mold 1 (Figs. 1 and 4) and is provided on its upper surface with a boss 55 which is adapted to engage complementary recesses 56 provided in the lower ends of the sections 9 of the blank mold, thereby maintaining the neck ring and the blank mold properly centered with respect to each other during the blank-forming operations.

Settling suction and counter-blowing pressure are applied to the interior of the blank mold by the following mechanism: A vertical fluid-pressure cylinder 57, having upper and lower cylinder heads 58 and 59 respectively, is mounted on the base 5 and is disposed beneath the blank mold in axial alignment therewith (Fig. 7). A piston 60 operates in the upper portion of the cylinder 57 and is provided with a tubular extension 61 which extends through and is slidably mounted in a vertically adjustable sleeve 62 which is threaded into the upper cylinder head 58. A plunger ring 63 is removably secured to the upper end of the extension 61 by means of a split collar and ring device 64 and is provided with a recess 65 for engagement with a boss 66 formed on the under side of the sections of the neck ring 3.

A piston 67 is mounted for operation in the lower portion of the cylinder 57 and is provided with a depending tubular extension 68 which extends through and is slidably mounted in the lower cylinder head 59 and is provided with an upwardly extending cylindrical barrel portion 70 which is slidably mounted in the extension 61 of the piston 60. A neck plunger 71 is removably secured to the upper end of the barrel portion 70 by means of a split collar 72 and is adapted to project through the plunger ring 63 and into the neck ring 3 to form an initial blowing opening in the neck of the blank. The lower end of the sleeve 62 extends into the upper portion of the cylinder 57 and constitutes an adjustable abutment for limiting the upward travel of the pistons 60 and 67 and the elements carried thereby, relative to the neck ring. The space between the pistons 60 and 67 communicates with the interior of the blank mold through passages 73, 74, 75 and 76 formed in the barrel portion 70, neck plunger 71 and neck ring 3 respectively.

At the commencement of a molding operation the neck plunger 71 is elevated by admitting fluid under pressure into the cylinder 57 beneath the lower piston 67, through a pipe 77. When the piston 67 is thus raised to elevate the neck plunger 71 to operative position, the base of this plunger engages the plunger ring 63 and elevates it also into operative position simultaneously therewith (Fig. 7). The raising of the plunger ring 63 also raises the piston 60, which is connected therewith, until its movement is arrested by engagement with the end of the sleeve 62. The pressure that is admitted beneath the piston 67 is preferably lower than the other operating pressures of the machine and is derived from a separate source, as will be hereinafter described.

As soon as the plunger ring and neck plunger are thus elevated and a mold charge is delivered to the blank mold, suction is applied to the space between the pistons 60 and 67 through a pipe 80 communicating with pipes 81 and 82 which respectively provide suction and blowing pressure to the blank mold (Fig. 3). This suction is transmitted through the passages 73, 74, 75 and 76 to the blank mold, and draws the glass downwardly into the neck ring and causes it to settle around the neck plunger 71 to form the outside finish of the neck of the bottle and the initial blowing depression therein. As soon as this operation is concluded, the pressure beneath the piston 67 is relieved and pressure is applied through the pipe 80 above this piston. This pressure maintains the piston 60 and plunger ring 63 in raised positions but forces the piston 67 downwardly and lowers the neck plunger 71 to a retracted position with respect to the neck of the blank. Upon the withdrawal of the neck plunger 71, the pressure between the pistons 60 and 67 is transmitted to the mold through the passages mentioned and counterblows the charge to form a completed parison. It will be noted, in this connection, that the pressure that maintains the piston 60 and the plunger ring 63 in an elevated position and forces the piston 67 downwardly to lower the neck plunger 71, is the same pressure that supplies counter-blowing pressure to the mold charge.

If desired, a spring 67a may be employed, as shown in Fig. 7, to depress the piston 67 as soon as the pressure beneath the piston 67 is relieved and before the counter-blowing pressure is applied through the pipe 80. The ends of the spring 67a, as shown, are received in suitable seats in the pistons 60 and 67.

At the conclusion of the blank-forming operation, the pressure between the pistons 60 and 67 is first relieved and pressure is admitted above the piston 60 through a pipe 83 which causes the piston 60 to descend and lower the plunger ring 63 out of operative engagement with the neck ring 3. The pressure in the upper portion of the cylinder 42 is then relieved, which permits the springs 46 to lift the piston 43 sufficiently to raise the cover plate 32 out of frictional engagement with the blank mold but not sufficiently to move the depression 38 out of lateral supporting engagement with the blank.

The pressure in the cylinder 14 is then relieved, permitting the springs 27 to open the blank mold leaving the bare blank supported by the neck ring 3 and prevented from tilting by the cover plate 32. Fluid pressure is then admitted to the lower portion of the cylinder 42 which elevates the cover plate out of engagement with the blank and swings the cover plate out of the path of travel of the blank and of the neck ring. The blank is now supported only by the neck ring, and is ready to be transferred to a position between the open sections of the blow mold 2 at the finish-blowing station. The mechanism which controls the timing of the settling suction, the counter-blowing, and the application of the several operating pressures, will be hereinafter described.

Figure 12:
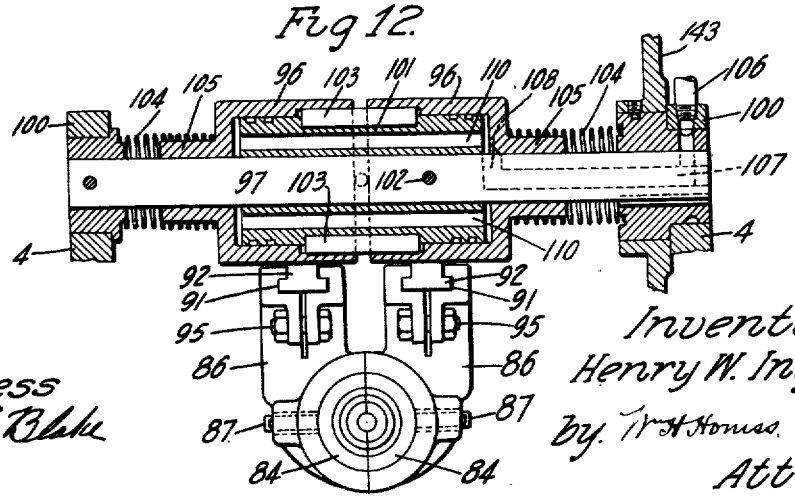
Fig. 12 is a horizontal sectional view through the mechanism which opens and closes the neck ring, the section being taken on line 12—12 of Fig. 4.

The neck ring 3, as best shown in Figs. 7 and 12, comprises two coacting sections 84, each of which is provided on its outer arcuate surface with a flange or tongue 85 for engagement with similarly shaped grooves provided in the arcuate extremities of a pair of horizontally extending arms 86. Each of the sections 84 is maintained in position by a pin 87 which is fixed in each section for loose engagement with an aperture 90 provided in each of the supporting arms 86. The sections of the neck ring are thus allowed a limited amount of floating movement in an angular direction to insure a proper contact therebetween when in a closed position.

Each of the arms 86 is provided at its inner end with a vertically extending groove 91 of T shape in cross section (Figs. 5 and 12), for adjustable sliding engagement with a tongue or track 92 of similar cross sectional shape provided on each of a pair of depending arms 94. Bolts 95 are provided to clamp the arms 86 to the arms 94 at the desired adjusted operating height, thus not only insuring an accurate joint between the neck ring and the blank mold, but permitting the use of molds of varying sizes according to the type of ware being produced.

The arms 94 are each carried by one of a pair of opposed fluid pressure cylinders 96 (Fig. 12), which are slidably mounted on a rock shaft 97 journaled in bearings 100 on the frame 4 and at a point intermediate the blank mold 1 and the blow mold 2. The inner ends of the cylinders 96 are open and cooperate with a common piston 101 which is fixed to the shaft 97 by means of a pin 102. The cylinders 96 are splined to the piston 101 by means of feather keys 103 which prevent the cylinders from rotating on the piston but permit them to slide thereon in an axial direction.

The cylinders 96 are yieldably held towards each other in order to normally maintain the sections of the neck ring in a closed position, by means of coil springs 104 which surround the shaft 97 between the bearings 100 and the cylinders 96, and which also surround hub portions 105 provided on the cylinders 96. Fluid pressure is simultaneously admitted to the cylinders 96 in order to force them apart and open the neck ring to release the blank at the proper time, through a pipe 106 which communicates with a passage 107 extending axially through one end of the shaft 97. The passage 107 communicates with the interior of the cylinders 96 through a port 108 and passages 110 provided in the shaft 97 and in the piston 101, respectively.

The shaft 97 is rocked in order to oscillate the neck ring between the blank-forming and finish-blowing stations, to transfer the blank from the former to the latter, by fluid pressure which is admitted to a horizontally disposed cylinder 111 (Fig. 4) through pipes 112 and 113. Check valves 114 and 115 are provided in the pipes 112 and 113 respectively and are disposed in such position as to direct the flow of air exhausted from the cylinder 111 through by-pass pipes 116 and 117 which are respectively provided with flow-regulating valves 120 and 121 (Fig. 3). By adjusting the valves 120 and 121 the pressure delivered to the cylinder 111 may be controlled as desired, thereby rendering it possible to vary the speed of the transfer and inversion according to the characteristics of the ware to be transferred. The pipes 112 and 113 communicate directly with passageways 122 and 123 which extend axially through the ends of a stationary piston rod 124 and communicate with the interior of the cylinder 111 adjacent to each side of a piston 125 (Fig. 4). The piston rod 124 is supported at its ends by depending brackets 126 which are carried by the base 5. The cylinder 111 is slidably mounted on the piston rod 124 and is provided with a track 127 which rides upon a roller 130 mounted on a shaft 131 (Fig. 4). A rack bar 132 is fixed to the upper side of the cylinder 111 and meshes with a segmental gear 133 which is mounted on a shaft 134. The shaft 134 is carried by a bearing 135 which is, in turn, carried by the base 5.

The segmental gear 133 is formed with an arm 136 which is provided with a roller 137 for engagement with a cam track 140 provided on an arm 141. The arm 141 is pivotally mounted at its lower end upon the shaft 131 and is provided at its upper end with a segmental rack 142. This rack meshes with a segmental gear 143 which is fixed to the shaft 97 and is provided with an arm 144 for engagement with stop pins 145 and 146. These pins are carried by one of the side frames 4 and arrest the swinging movement of the neck ring 3 at the blank-forming and finish-blowing stations.

Considering the machine with its parts occupying the position shown in Fig. 4, it will be apparent that when fluid under pressure is admitted to the cylinder 111 through the pipe 112, the cylinder will be forced forwardly (to the left in Fig. 4) and will cause the arm 136 to rock upwardly and rearwardly through the medium of the rack bar 132 and the segmental gear 133. This movement of the arm 136 will cause the arm 141 to swing rearwardly, thus swinging the neck ring 3 upwardly and forwardly, through the medium of the segmental rack 142 and gear 143, until its movement is arrested by the engagement of the arm 144 with the stop pin 145.

It will be noted that the arms 86 and 94 together form an L shaped support for the neck ring which offsets this element from a horizontal plane passing through the axis of swinging movement, whereby the blank is transferred from the blank-forming station to the finish-blowing station with the longitudinal axis thereof disposed substantially tangentially to the arc described by the center of gravity of the blank during the transferring operation. Throughout this movement the line of action of the impelling force exerted by the neck ring falls outside the center of gravity of the parison, thereby producing a moment tending to revolve the parison about its own center of gravity, and thus invert it. Furthermore, the force of gravity tending to distort the blank laterally is balanced by the centrifugal force incident to the swinging of the carrier and the neck ring, and this balance between gravity and centrifugal force may be accurately maintained by suitably accelerating or decelerating the speed at which the carrier is swung.

The foregoing may be more readily understood by referring to Fig. 19 of the drawing, which is a composite diagrammatic view illustrating the method of the present invention, wherein a blank $a$ is swung about a horizontal axis $x$ from a blank-forming station BF to a finish-blowing station FB, in comparison with the prior method of transferring a blank $b$ between these stations. It will be observed that the impelling force F, and the inertial reaction I of the parison $a$ through its center of gravity form a couple tending to start the parison rotating about its center of gravity $m$. In the case of the blank $b$ in which the neck ring is not offset, the impelling force F' and the inertial reaction I' are in the same straight line, and therefore do not form such a couple. The rotation of the blank $b$ about its center of gravity must be caused by a couple transmitted through the neck which tends to distort the neck in its plastic condition. It will be apparent that the blank $a$ is in a similarly favorable condition during deceleration, the retarding force exerted by the neck ring and the inertial force acting through the center of gravity of the parison forming a couple which tends to check the revolution of the parison about its center of gravity, and thus bring it to rest when the transfer is completed.

The time of transfer is so regulated that the centrifugal force just balances the gravitational force as follows: Referring to Fig. 20, let $m$ be the mass of the parison and $l$ the distance of the center of gravity from the point of support. Also $\theta$ is the angle through which the blank has revolved, $w$ is the angular velocity and $r$ the radius to the center of gravity. Then the centrifugal force is $mw^2r$, and its moment about the neck ring is $mw^2rl$. Similarly, the moment of the force of gravity about the neck ring is $mgl \sin \theta$. If the effect of gravity is to balance the centrifugal effect, these must be equal, hence $mw^2rl = mgl \sin \theta$ or $$w = \sqrt{\frac{g}{r}} \sqrt{\sin \theta}$$

In accordance with the usual notation $$w = \frac{d\theta}{dt}$$

hence $$t = \sqrt{\frac{r}{g}} \int \frac{d\theta}{\sin \theta}$$

On computing the integral, the angle $\theta$ may be found as an elliptic function of the time, and the motion properly designed to produce the transfer without distortion, the radius being related to the period of transfer by the equation $r = 1.169 T^2$.

Figure 10:
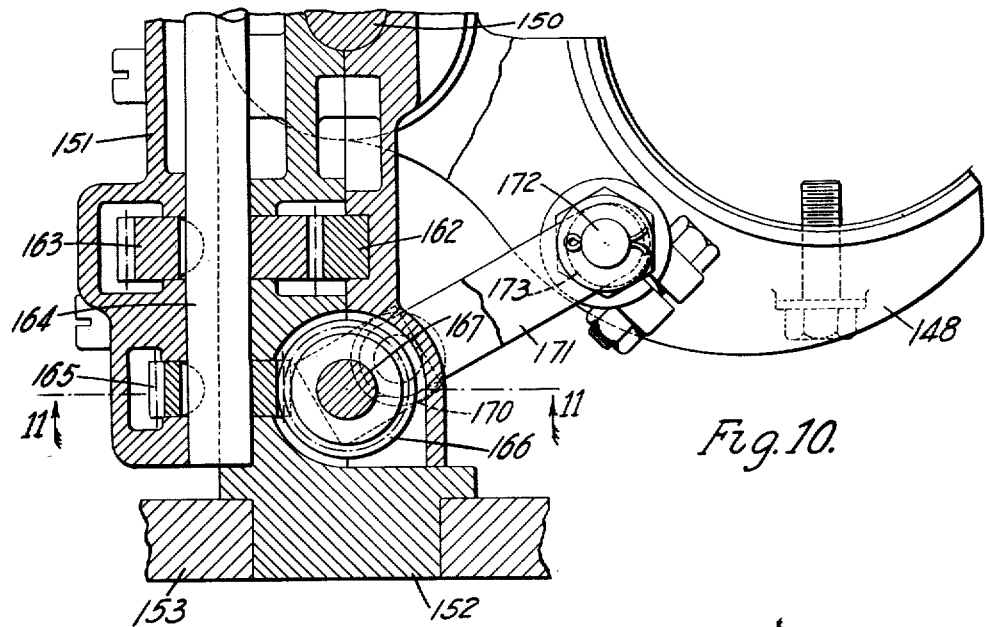
Fig. 10 is an enlarged fragmentary sectional view taken on line 10—10 of Fig. 11, illustrating the mechanism which opens and closes the respective sections of the blow mold.
Figure 11:
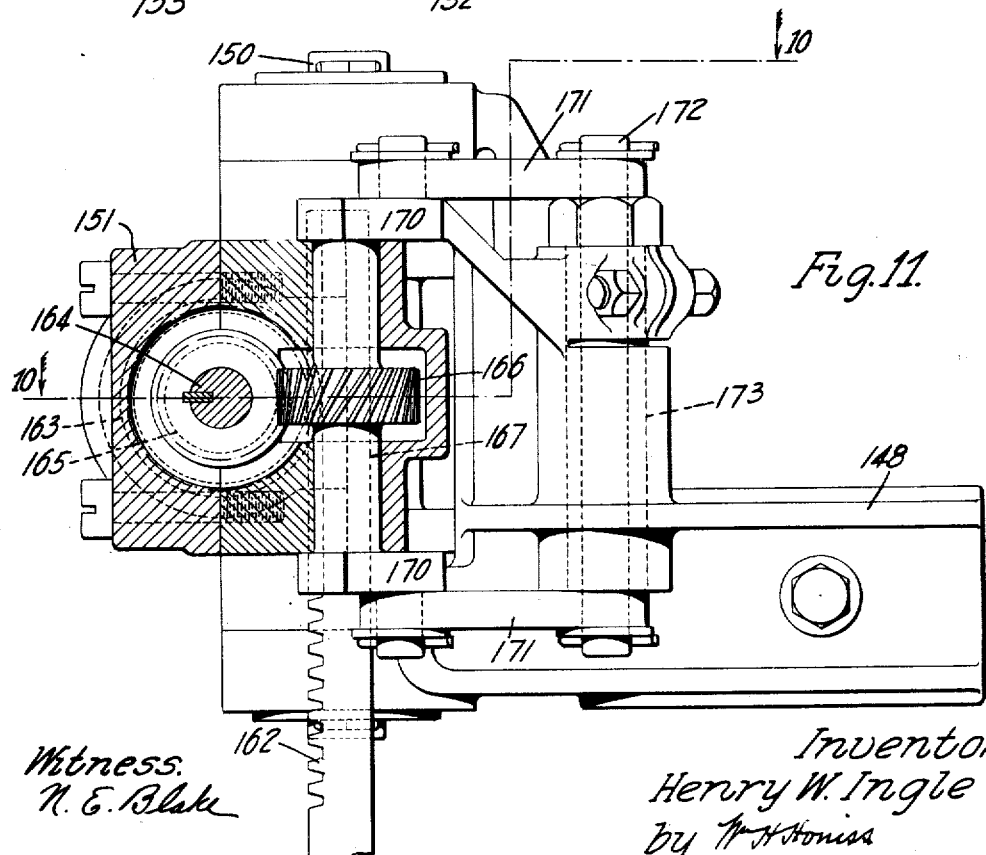
Fig. 11 is a view, partly in side elevation and partly in section on line 11—11 of Fig. 10.

When the neck ring 3 is actuated, as heretofore described, to transfer a formed blank to the finish-blowing station, the blank is deposited in the open blow mold 2 in a neck-up position. The blow mold 2, in the present instance, is fixed in position and comprises two cooperating sections 147 which are detachably secured to mold holders 148 (Figs. 5, 10 and 11). The mold holders are hinged upon a pin 150 which is carried by housing 151 having trunnions 152 provided at each end thereof and which are secured to the side frame elements 4 by clamping members.

The blow mold 2 is opened and closed at proper times by means of fluid pressure which is admitted to a vertically disposed cylinder 154 through pipes 155 and 156 (Figs. 3 and 4). These pipes are respectively provided with valves 157 and 158 (Fig. 3) by means of which the flow of pressure delivered to the cylinder 154 may be regulated as desired. The cylinder 154 is mounted on the base 5 of the machine and is provided with a piston 160 which is carried by a piston rod 161 (Fig. 4). The piston rod 161 extends entirely through and is slidably mounted in both of the heads of the cylinder 154 and is provided at its upper end with a rack bar 162. This rack bar is slidably mounted in the housing 151 and meshes with a spur gear 163 which is fixed to a horizontal shaft 164 (Figs. 10 and 11). The shaft 164 is journaled in the housing 151 and is provided with spiral gears 165 at each end thereof, which mesh with spiral gears 166 fixed to vertical shafts 167. The shafts 167 extend entirely through the housing 151 and are provided at each end with a crank 170. The cranks 170 are connected to the blow mold holders 148 by means of links 171 and together form a toggle to lock the mold sections in a closed position during the blowing operation. The connections between the links 171 and the blow mold holders 148 comprise pins 172 which extend through eccentric bushings 173. These bushings are mounted for rotary adjustment in the blow mold holders 148 in order to secure an accurate contact between the sections 147 of the blow mold when in a closed position.

With reference to Figs. 4, 10 and 11, in which the blow mold 2 is shown as occupying a closed position with the rack bar 162 and piston 160 at the limit of their downward strokes, it will be apparent that at the completion of the finish-blowing operation, the application of pressure beneath the piston 160 will elevate the rack bar 162. As the rack bar 162 is raised, the gear 163 will be rotated, causing the rotation of the spiral gears 165 and the partial rotation of the spiral gears 166 and shafts 167. This partial rotation of the shafts 167 will cause the cranks 170 to swing upon their axes and open the blow mold through the medium of the connecting links 171.

The lower portion of the blow mold is closed by a bottom plate 174, which is supported by a holder 175. This holder is slidably mounted in a clamp 176, which is carried by the base 5 of the machine. The bottom plate 174 may be adjusted vertically with respect to the blow mold by loosening the clamp 176 and manipulating an adjusting nut 177, which is threaded onto the holder 175 and which rests on the top of the clamp 176.

The upper portion of the blow mold is adapted to be closed by a blow head 180 (Fig. 8), which is detachably secured to a hollow arm 181 by a suitable bayonet joint connection 182. The blow head is provided with an opening 183 which registers with a nozzle 184 formed on the arm 181 and is maintained against displacement by means of a spring 185, but at the same time is free to move sufficiently to make a proper contact with the top of the blow mold. As shown in Fig. 4, the arm 181 is adjustably secured to the lower end of a piston rod 186 which extends upwardly through heads 187 and 188 of a fluid-pressure cylinder 190 and is provided with a piston 191. This cylinder is carried by one of the side frame elements 4 and is supplied with fluid under pressure at points above and below the piston through pipes 192 and 193 respectively. A plurality of springs 194 are suitably seated in the lower cylinder head 187 and tend to maintain the blow head 180 out of frictional contact with the blow mold when pressure in the cylinder 190 is exhausted, by providing a resilient support for the piston 191.

Blowing pressure is delivered to the blank in the blow mold through a pipe 195 which communicates with a circular recess 196 provided in the upper cylinder head 188. When the blow head is in operative position, the recess 196 communicates with a passageway 197 which extends axially through the piston rod 186 and communicates at its lower end with the interior of the hollow arm 181.

The upper portion of the piston rod 186 extends into a housing 200 which is formed on the upper cylinder head 188 and is provided with a spiral slot 201 for engagement by a pin or roller 202 carried by the piston rod 186. As the piston rises to elevate the blow head at the completion of a blowing operation, the slot 201, acting on the pin 202, imparts a partial rotation to the rod 186 that is sufficient to swing the blow head 180 in a lateral direction out of the path of the neck ring as it swings between the blank-forming and finish-blowing stations.

In Figs. 4 and 9 the blow head 181 is shown as contacting with the top of the blow mold during the finish-blowing operation, the neck ring having been returned to the blank-forming station. By this arrangement, the blowing operation may overlap the succeeding blank-forming operation, thus permitting the ware to remain in the blow mold for a relatively long interval of time. However, it is possible to time the operations of the machine so that the neck ring will remain in engagement with the neck of the ware until the final blowing operation is concluded, in which case the blow head 180 will seat directly upon the neck ring as illustrated in Fig. 8.

*Delivering mechanism*

Figure 2:
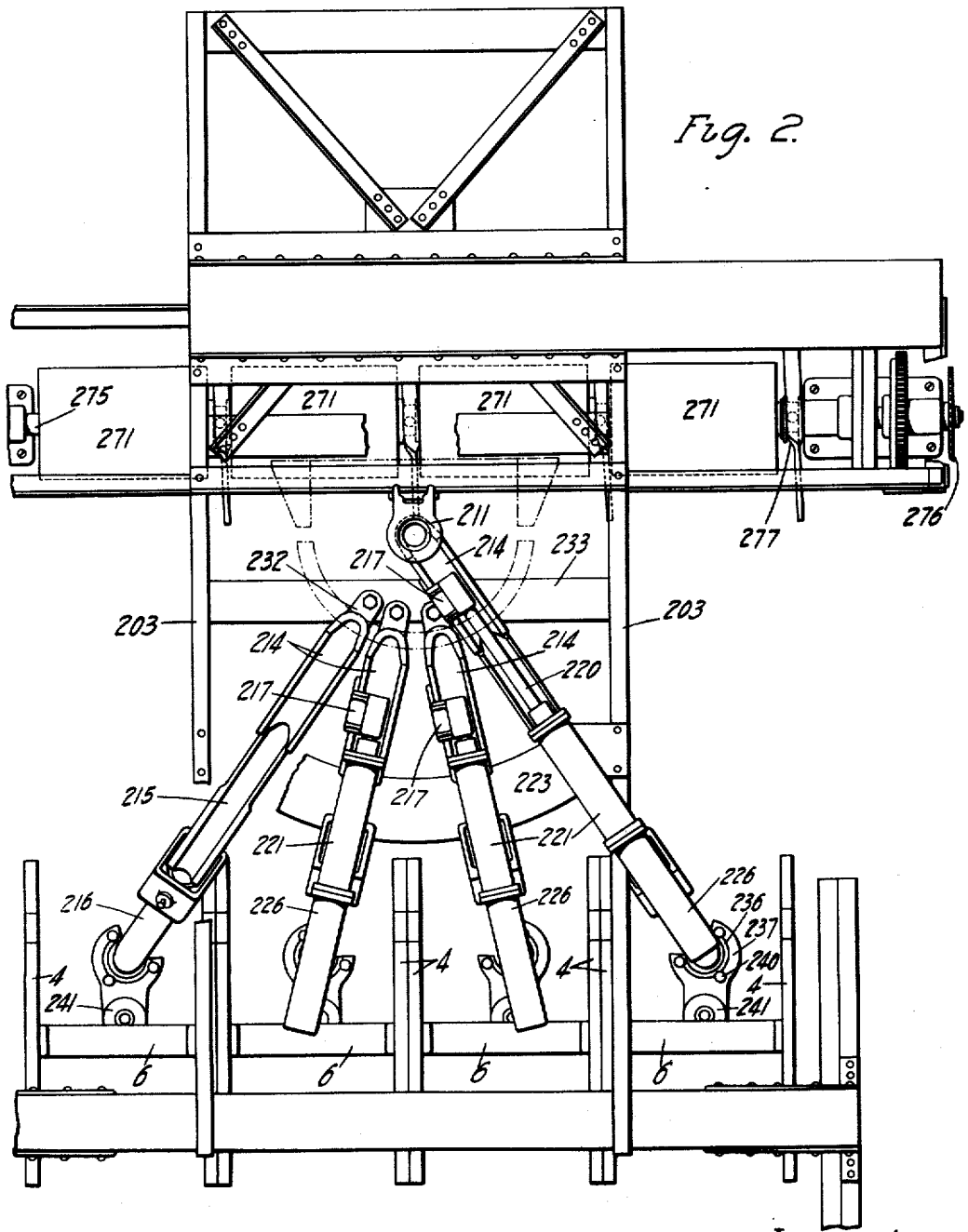
Fig. 2 is a plan view of the structure shown in Fig. 1, illustrating in particular the mechanism for successively delivering mold charges from a single feeding outlet to the several shaping machines.

The delivering mechanism B which conveys the mold charges to the several shaping machines A is supported by a suitable frame structure 203 (Fig. 1) and comprises a funnel element 204 and a plurality of troughs or guideways 205 which extend radially from the funnel element to the several shaping machines (Figs. 1 and 2). The funnel 204 is supported by a bracket 206 beneath an outlet 207 in the forehearth (only a portion of which is shown in Fig. 1) of a glass feeding mechanism that is adapted to deliver molten glass in successive mold charges of predetermined size and shape, which are cut off by suitable shears 210. The surface of the funnel 204 may be lubricated by air or steam under pressure which is projected over the surface thereof from an annular chamber 211 mounted on the upper edge of the funnel. The lubricating fluid under pressure is supplied to the chamber 211 from a pipe 212 which leads from a convenient source of supply and is provided with a flow-regulating valve 213 (Fig. 3).

Each of the guideways 205 comprises a horizontally reciprocable trough section or distributor 214 which intercepts the mold charges issuing from the funnel 204, a vertically adjustable trough section 215 which conveys the mold charges to the shaping machine, and a laterally adjustable deflector 216 which directs the mold charges accurately into an awaiting mold (Fig. 1). Each of the movable trough sections 214 is carried by a bracket 217, which is mounted upon one end of a horizontally reciprocable piston rod 220. The piston rod 220 extends entirely through a fluid pressure cylinder 221, which is mounted upon a bracket 222 carried by a transversely extending supporting beam 223 which is mounted upon the frame structure 203 and which constitutes a support for all the cylinders 221 (Fig. 2). The piston rod 220 is prevented from rotating and displacing the trough section 214 by means of a pin 224 which extends transversely through the piston rod 220 for engagement with slots 225, provided in a tubular housing 226 formed on one of the heads of the cylinder 221. The trough section 214 is projected in a rectilinear path to a position beneath the funnel 204 and in alignment with the trough section 215 in order to deliver a mold charge to the shaping machine, by means of fluid pressure, which is admitted to the cylinder 221 from a pipe 227 (Figs. 1 and 3). The pipe 227 may be provided with a valve 230 in order to regulate the admission of air to the cylinder 221 and the operating speed of the trough 214. At the conclusion of a delivery operation, and as soon as the pressure within the cylinder 221 has been relieved, the trough section 214 is withdrawn from operative position with respect to the funnel 204 and the trough section 215, by means of a spring 231, which is secured at one end to the piston rod 220 and at the other end to the cylinder 221. This spring positively maintains the trough section 214 in a retracted position with respect to the outlet of the feeder when the operation of the machine is discontinued or in the event of failure in the pressure supply to the cylinder 221. It will be understood in this connection that the troughs 214 of the several guideways operate in succession and in timed relation with respect to the action of the feeding device in order to deliver mold charges successively to the several shaping machines.

Each of the trough sections 215 is detachably hinged at its upper end as at 232 to a transversely extending beam 233, and is supported at its lower end for vertical adjustment by a screw 234 carried by a bracket element 235, secured to the upper end of the deflector 216. The deflector 216 is provided with an arcuate flange 236 which is secured to a supporting plate 237 by means of suitable clamping bolts 240. These bolts may be loosened and the deflector swung laterally about the axis of a mold in order to adjust the upper end of the deflector with respect to the trough 215. The plate 237 is adjustably secured to the lower end of a bracket 241 which is carried by the tubular brace 6, through the medium of a bolt 242 and an intermediate plate 243. The plate 237 is keyed to the plate 243 for sliding movement in a longitudinal direction as at 244 (Fig. 4), and the plate 243 is keyed to the bracket 241 for movement in a lateral direction, as at 245.

It will be apparent that by loosening the bolt 242, the plates may be shifted horizontally in directions transverse to each other, in order to properly align the lower end of the deflector 216 with the blank mold.

A chute 246 is carried by the frame 203 with its upper end in position beneath the funnel 204 and the outlet of the feeding mechanism, and is adapted to receive mold charges issuing from the feeding mechanism and convey them to a dump or cullet pit in the event that none of the troughs 214 are in position to intercept them.

Pressure control mechanism

The pressure control mechanism C, which adjustably times the operations of each of the shaping machines and the delivery mechanisms, is similar to that described in detail in my co-pending application Serial No. 735,079, previously referred to. A general description of this mechanism is, therefore, deemed sufficient for the present purpose.

Briefly, each of these mechanisms comprises a valve chest 250, which is supplied with air under pressure from a source of supply by pipe 251, and with which all of the pipes communicate that supply fluid pressure to the operating cylinders previously described, with the exception of the pipe 77. Communication between the valve chest 250 and these pipes is controlled by valves 252. The valve chest 250 is provided with chambers 253, 254, 255 and 256 (shown in dotted lines in Fig. 3) which are respectively supplied with reduced operating pressure for the cylinder 57, settling suction, counter-blowing and finish-blowing pressures by pipes 260, 261, 262 and 263, and with which the pipes 77, 81, 82 and 195 respectively communicate. Communication between these last mentioned pipes and their respective chambers is controlled by valves 264.

The several valves above mentioned of the control mechanisms of each shaping machine are opened at the desired time intervals by studs 270 (Fig. 1), which are provided on the surface of a constantly rotating drum 271, through the medium of levers 272 which are pivotally mounted on the valve chest 250. The valves are maintained open by latch elements 273 until these elements are tripped by studs 274, also provided on the surface of the drum 271. The duration of the time intervals between the opening and closing of the several valves are determined by the distances between the studs 270 and 274, it being understood that the studs are secured to the drum for adjustment towards or away from each other. Thus, by increasing or decreasing the distance between the studs 270 and 274 for each valve, or by shifting the position of one set of studs relative to another, the duration of the several operating pressures may be controlled as desired, and also the time of occurrence of any operation may be regulated relative to the time of occurrence of the other operations.

The drums 271 are all mounted upon a common shaft 275, which is driven in timed relation with the feeding mechanism through the medium of a sprocket wheel 276 (Fig. 2). Each of the drums 271 may be individually disconnected from the shaft 275 by clutch members 277, thus rendering it possible to discontinue the operation of any one of the sections of the shaping machine, without disturbing the operations of the others.

In the operation of the apparatus described above, mold charges of molten glass are delivered by the feeder through the funnel 204 and are received in succession by the movable trough sections 214 and delivered into the blank molds. Each section of the machine proceeds independently of the other sections to fabricate the mold charges which it receives, first applying settling suction in the blank mold; then counter blowing the parison in the blank mold; then opening the blank mold, and swinging the blank by the neck ring to an upright position at the finish-blowing station during which time the blank or parison is permitted to reheat; then closing the blow mold and finish-blowing the ware, and finally opening the blow mold to release the ware. It will be understood that from the time that contact between the parison and the blank mold is broken until the time that the parison is blown into contact with the walls of the blow mold, the parison reheats, that is to say, the internal heat of the glass softens its chilled outer surface or skin which is caused by contact with the walls of the blank mold.

As pointed out above, each of these operations, including the reheating of the parison, may be made as long or as short as desired, provided that all of the successive steps are performed in time to enable the blank mold to receive its next charge of glass in its proper turn. The several operating steps are given an alloted portion of the cycle of operations by suitably changing the positions of the pins 270 and 274, upon the valve actuating drum 271.

The cycles of operation may be so arranged that the blow molds are active almost continuously, as diagrammatically illustrated in Fig. 21. That is to say, the ware may be taken out of each blow mold immediately before a fresh parison is delivered thereto by the neck ring. Such a method of operation makes for efficiency in temperature control, especially when relatively heavy molds are employed. Likewise, the parison mold may be kept in operation almost continuously, if desired, because as soon as a blank is transferred to the blow mold and the neck ring returned to the blank-forming station, the blank mold may be closed and is then in condition to immediately receive another mold charge for the fabrication of a parison for subsequent transfer to the blow mold during the time that the parison previously formed in the same blank mold is being blown to final form in the associated blow mold. When the parison is formed, that is to say, when all of the several shaping operations are concluded, the sections of the blank mold are opened leaving the bare parison supported by the neck ring and baffle plate, thereby permitting the internal heat therein to reheat the chilled skin. This reheating operation is thus performed in the blank mold cycle and during the latter stage of the finish blowing operation of the preceding parison, thus allowing ample time for both the reheating and finish blowing operations, as compared with prior methods in which the reheating operations occurred in the blow mold and which therefore unduly prolonged the duration of the blow mold cycle and the time that the blank mold was idle. This practically continuous operation of the blank and blow molds renders it possible to shape a parison in a blank mold during the time that a parison previously shaped in the same blank mold is being blown to final form in the associated blow mold.

One of the chief advantages of the "individual section" machine described herein is that the cycle of any section may be so adjusted as to give a much greater part of the cycle to the operations in the blank mold than is possible in any prior machine. In rotary machines, the operations of settling and counterblowing in the blank mold are confined to narrow time-limits, whereas in the present machine it is possible not only to provide a long interval of time between the mold-charging and transferring operations, but also to distribute the settling and counterblowing intervals within limits which are much wider than the limits for these operations than are possible in prior machines.

As pointed out above, the mounting of the molds on stationary supports makes it possible to make the molds much more massive than when the molds are mounted on moving tables. A massive mold containing a relatively large mass of metal may be maintained at the proper temperature for absorbing heat from the glass, without fluctuating below this temperature when the molds are opened, and above this temperature when the hot glass is first introduced into the mold.

The increased speed of production, made possible by correctly proportioning the cycles of operations with respect to the types of ware being made, enables a given quantity of ware to be produced with fewer molds than is possible on ordinary machines. Thus, for example, four sections constructed as described herein, are capable of performing the work for which six pairs of molds are ordinarily required. The savings in the cost of molds is therefore considerable. In certain of the appended claims the words "forming", or "formation" are used in respect to the parison in stating that certain operations occur in simultaneous or overlapping time relationship. By these words are meant any positive forming operations upon the glass, that is forming operations positively carried out by the application of some force or forces other than gravity alone acting directly upon the glass.

From the foregoing it will be apparent that a relatively simple and efficient glass working apparatus is provided which embodies a plurality of independently operable glass shaping machines which may be employed for the simultaneous production of ware of different shapes and which is therefore particularly useful in the manufacture of limited quantities of such ware.

The particular embodiment of the invention illustrated and described has been selected by way of example only, and it is to be understood that various modifications may be employed in fulfilling the spirit of the invention as defined in the claims.

What I claim is:

1. Apparatus for shaping hollow glassware, comprising a blank mold and a blow mold mounted in fixed relation with respect to each other, means for independently opening and closing said molds, means for counterblowing mold charges in said blank mold to form parisons, means for transferring the parisons thus formed to said blow mold, means for blowing the parisons to final form in said blow mold, and an automatic timing mechanism for causing a mold charge to be counterblown in said blank mold during at least a portion of the time that a parison previously formed in the same blank mold is being subjected to final blowing pressure in said blow mold.

2. Apparatus for shaping hollow glassware, comprising a blank mold and blow mold mounted in fixed relation with respect to each other, means for independently opening and closing said molds, means for forming parisons in said blank mold, means for transferring the parisons thus formed to said blow mold, means for blowing the parisons to final form in said blow mold, and automatic control mechanism for timing the opening and closing of said molds to cause said transferring means to support a parison out of contact with said blank mold, to permit the heat therein to reheat the chilled skin thereof, during at least a portion of the time that a parison previously formed in the same blank mold is being subjected to final blowing pressure in said blow mold.

3. Apparatus for shaping hollow glassware, comprising a blank mold and blow mold mounted in fixed relation with respect to each other, means for independently opening and closing said molds, means for forming parisons in said blank mold, means for transferring the parisons thus formed to said blow mold, means for blowing the parisons to final form in said blow mold, and an automatic timing mechanism for causing said blank mold to open and release a parison during the time that a parison previously formed in the same blank mold is being subjected to final blowing pressure in said blow mold.

4. Apparatus for shaping hollow glassware, comprising a blank mold and blow mold mounted for cooperation solely with each other, means for independently opening and closing said molds, means for forming parisons in said blank mold for transfer to said blow mold, means for transferring all the parisons thus formed successively to said blow mold, means for blowing the parisons to final form in said blow mold, and automatic control mechanism for timing the opening and closing of said blank and blow molds, said timing means being arranged to maintain a parison formed in said blank mold for transfer to said blow mold out of contact with said blank mold during at least a portion of the time that a parison previously formed in the same blank mold is in contact with said blow mold.

5. Apparatus for shaping hollow glassware, comprising a blank mold, a single neck ring and a blow mold mounted for cooperation solely with each other, independent means for opening and closing said blank mold and said neck ring, the interval of time between the closing movements of said blank mold determining the duration of the blank mold cycle, means for opening and closing said blow mold, the interval of time between the closing movements of said blow mold determining the duration of the blow mold cycle, means for forming parisons in said blank mold and said neck ring for transfer to said blow mold, means for transferring all the parisons thus formed successively to said blow mold, means for blowing the parisons to final form in said blow mold, and an automatic timing mechanism for causing the mold opening and closing, blank forming, transferring and finished blowing operations to occur in such timed relation with respect to each other that a parison is being formed in the blank mold during at least a portion of the time that a parison previously formed in the same blank mold is being subjected to final blowing pressure in the corresponding blow mold, said mechanism being adjustable to shift the timed occurrence of said operations relative to each other, whereby the interval of time during which the parison is maintained out of contact with the blank and blow molds may be shifted wholly or in part from one of said mold cycles to the other.

6. Apparatus for shaping hollow glassware, comprising a blank mold and blow mold mounted for cooperation with each other, means for forming parisons in said blank mold, means for transferring the parisons thus formed to said blow mold, means for blowing the parisons to final form in said blow mold, and an automatic timing mechanism for causing said blank forming and finish blowing operations to occur in timed relation with respect to each other, said mechanism including a series of valves, a movable support, a pair of studs carried by said support for cooperation with each of said valves, one stud of each pair of studs being adapted to open its associated valve and the other of said pair being adapted to close said valve.

7. Apparatus for shaping hollow glassware, comprising a blank mold and blow mold mounted for cooperation with each other, means for forming parisons in said blank mold, means for transferring the parisons thus formed to said blow mold, means for blowing the parisons to final form in said blow mold, and an automatic timing mechanism for causing said blank forming and finish blowing operations to occur in timed relation with respect to each other, said mechanism including a series of valves, a movable support, a pair of studs carried by said support for cooperation with each of said valves, one stud of each pair of studs being adapted to open its associated valve and the other of said pair being adapted to close said valve, the studs of each pair being adjustable toward and away from each other to increase or decrease the duration of the operation controlled thereby.

8. Apparatus for shaping hollow glassware, comprising a blank mold and blow mold mounted for cooperation with each other, means for forming parisons in said blank mold, means for transferring the parisons thus formed to said blow mold, means for blowing the parisons to final form in said blow mold, and an automatic timing mechanism for causing said blank forming and finish blowing operations to occur in timed relation with respect to each other, said mechanism including a series of valves, a movable support, a pair of studs carried by said support for cooperation with each of said valves, one stud of each pair of studs being adapted to open its associated valve and the other of said pair being adapted to close said valve, each of said pairs of studs being adjustable relative to each other to vary the time of occurrence of the operations controlled thereby.

9. Apparatus for shaping hollow glassware, comprising a blank mold and blow mold mounted for cooperation with each other, means for forming parisons in said blank mold, means for transferring the parisons thus formed to said blow mold, means for blowing the parisons to final form in said blow mold, and an automatic timing mechanism for causing said blank forming and finish blowing operations to occur in timed relation with respect to each other, said mechanism including a series of valves, a movable support, a pair of studs carried by said support for cooperation with each of said valves, one stud of each pair of studs being adapted to open its associated valve and the other of said pair being adapted to close said valve, and means for maintaining said valve open during the interval between the opening and closing of said valve.

10. Apparatus for shaping hollow glassware, comprising a blank mold and blow mold mounted for cooperation with each other, means for forming parisons in said blank mold, means for transferring the parisons thus formed to said blow mold, means for blowing the parisons to final form in said blow mold, and an automatic timing mechanism for causing said blank forming and finish blowing operations to occur in timed relation with respect to each other, said mechanism including a series of valves, a movable support, a pair of studs carried by said support for cooperation with each of said valves, one stud of each pair of studs being adapted to open its associated valve and the other of said pair being adapted to close said valve, and a latch for maintaining said valve open during the interval between the opening and closing of said valve.

11. Apparatus for shaping hollow glassware, comprising a blank mold and blow mold mounted for cooperation with each other, means for forming parisons in said blank mold, means for transferring the parisons thus formed to said blow mold, means for blowing the parisons to final form in said blow mold, and an automatic timing mechanism for causing said blank forming and finish blowing operations to occur in timed relation with respect to each other, said mechanism including a series of valves, a rotatable drum associated therewith, a series of relatively short studs carried by said drum and adapted to open said valves in a predetermined order, a latch for maintaining each of said valves open when actuated by said short stud and a series of relatively long studs carried by said drum and adapted to trip said latches and to close said valves.

12. Apparatus for shaping hollow glassware, comprising a blank mold and blow mold mounted for cooperation with each other, means for forming parisons in said blank mold, means for transferring the parisons thus formed to said blow mold, means for blowing the parisons to final form in said blow mold, and an automatic timing mechanism for causing said blank forming and finish blowing operations to occur in timed relation with respect to each other, said mechanism including a series of valves, a latch associated with each of said valves, a rotatable drum having a series of peripheral grooves provided therein, a pair of studs mounted in each of said grooves for independent circumferential adjustment, each of said pairs of studs including a relatively short stud and a relatively long stud, the short stud of each pair being adapted to move its associated valve to a position in which it is maintained open by its latch, and the long stud of said pair being adapted to subsequently trip said latch to close said valve.

13. Apparatus for shaping hollow glassware, comprising a blank mold and a blow mold mounted in fixed relation with respect to each other, a shaft disposed between said stations, a pair of arms slidably mounted on said shaft, a neck ring carried by said arms, means for oscillating said shaft and arms to transfer parisons from said blank mold to said blow mold, and means for sliding said arms on said shaft to open and close said neck rings.

14. In a glass shaping apparatus, the combination of a blank mold and a blow mold respectively disposed in permanent neck-down and neck-up positions on substantially the same working level, a pair of arms mounted for swinging movement about a single fixed axis located intermediate said molds, a neck ring carried by said arms, means for swinging said arms and neck ring about said axis to transfer a blank from said blank mold to said blow mold and to invert said blank, and means movable with said arms for opening and closing said neck ring.

15. In a glass shaping apparatus, the combination of a blank mold and a blow mold respectively disposed in permanent neck-down and neck-up positions on substantially the same working level, a pair of arms mounted for swinging movement about a fixed axis, a neck ring carried by said arms, means for swinging said arms and neck ring about said axis to transfer a blank from said blank mold to said blow mold, and fluid pressure means movable with said arms for opening and closing said neck ring.

16. In a glass shaping apparatus, the combination of a blank mold and a blow mold respectively disposed in permanent neck-down and neck-up positions on substantially the same working level, a pair of arms mounted for swinging movement about a fixed axis, a neck ring carried by said arms, means for swinging said arms and neck ring about said axis to transfer a blank from said blank mold to said blow mold, and a fluid pressure device mounted concentric with said axis and fixed to said arms for opening and closing said neck ring.

17. In a glass shaping apparatus, the combination of a blank mold and a blow mold respectively disposed in permanent neck-down and neck-up positions on substantially the same working level, a pair of arms mounted for swinging movement about a fixed axis, a neck ring carried by said arms, means for swinging said arms and neck ring about said axis to transfer a blank from said blank mold to said blow mold, fluid pressure means movable with said arms and disposed concentric with said axis for separating said arms to open said neck ring, and resilient means for closing said neck ring.

18. In a glass shaping apparatus, the combination of a blank mold and a blow mold respectively disposed in permanent neck-down and neck-up positions, a shaft disposed intermediate of said molds, a pair of pistons and cooperating cylinders carried by said shaft, an arm carried by each of said cylinders, a neck ring carried by said arms, means for swinging said arms and neck ring about the axis of said shaft to transfer a blank from said blank mold to said blow mold, and means for supplying fluid pressure to said cylinders to separate said arms to open said neck ring.

19. In a glass shaping apparatus, the combination of a blank mold and a blow mold respectively disposed in permanent neck-down and neck-up positions, a shaft disposed intermediate of said molds, a pair of pistons and cooperating cylinders carried by said shaft, an arm carried by each of said cylinders, a neck ring caried by said arms, means for swinging said arms and neck ring about the axis of said shaft to transfer a blank from said blank mold to said blow mold, means for supplying fluid pressure to said cylinders to separate said arms to open said neck ring, and resilient means for moving said arms toward each other to close said neck ring.

20. In a glass shaping apparatus, the combination of a blank mold and a blow mold respectively disposed in permanent neck-down and neck-up positions, a shaft disposed intermediate of said molds, a pair of pistons and cooperating cylinders carried by said shaft, an arm carried by each of said cylinders and extending at an angle to the horizontal plane of the axis of swing, a neck ring carried by said arms and disposed parallel to said plane, means for swinging said arms and neck ring about the axis of said shaft to transfer a blank from said blank mold to said blow mold, and means for supplying fluid pressure to said cylinders to separate said arms to open said neck ring.

21. In a glass shaping apparatus, the combination of a blank mold and a blow mold respectively disposed in permanent neck-down and neck-up positions, a pair of arms mounted for swinging movement about a single fixed axis located intermediate said molds, a neck ring carried by said arms, means for swinging said arms and neck ring about said axis to transfer a blank from said blank mold to said blow mold and to invert said blank, and means movable with said arms for opening and closing said neck ring.

22. In a glass shaping apparatus, the combination of a blank mold and a blow mold respectively disposed in permanent neck-down and neck-up positions, a pair of arms mounted for swinging movement about a fixed axis, a neck ring carried by said arms, means for swinging said arms and neck ring about said axis to transfer a blank from said blank mold to said blow mold, and fluid pressure means movable with said arms for opening and closing said neck ring.

23. In a glass shaping apparatus, the combination of a blank mold and a blow mold respectively disposed in permanent neck-down and neck-up positions, a pair of arms mounted for swinging movement about a fixed axis, a neck ring carried by said arms, means for swinging said arms and neck ring about said axis to transfer a blank from said blank mold to said blow mold, and a fluid pressure device mounted concentric with said axis and fixed to said arms for opening and closing said neck ring.

24. In a glass shaping apparatus, the combination of a blank mold and a blow mold respectively disposed in permanent neck-down and neck-up positions, a pair of arms mounted for swinging movement about a fixed axis, a neck ring carried by said arms, means for swinging said arms and neck ring about said axis to transfer a blank from said blank mold to said blow mold, fluid pressure means movable with said arms and disposed concentric with said axis for separating said arms to open said neck ring, and resilient means for closing said neck ring.

25. In a glass shaping machine, a forming unit for hollow glass articles, comprising a blank mold, a single neck ring cooperating therewith, means for forming a blank in said mold and neck ring, a blow mold, means for transferring a blank formed in said blank mold to said blow mold by a relative movement of said neck ring and said blow mold, means for opening said neck ring after it has deposited a blank in said blow mold, means for thereafter causing said neck ring to cooperate with said blank mold when the latter is closed, means for blowing said blank to final form in said blow mold, and timing means for controlling the operation of all the above named means and arranged to control said means so that a blank is being formed in said blank mold and said neck ring during at least a part of the time the preceding blank is being subjected to final blowing pressure in said blow mold.

26. In a glass shaping machine, a forming unit for hollow glass articles, comprising a blank mold, means for feeding mold charges thereto, a single neck ring cooperating therewith, a blow mold, means for forming a blank in said mold and neck ring for transfer to said blow mold, means for transferring the blank so formed in said blank mold to said blow mold by a relative movement of said neck ring and said blow mold, means for opening said neck ring after it has deposited a blank in said blow mold, means for thereafter causing said neck ring to cooperate with said blank mold when the latter is closed, means for blowing said blank to final form in said blow mold, and timing means for controlling the operation of all the above named means and arranged to control said means so that a mold charge will be fed to said blank mold for formation into a blank for transfer to said blow mold during the time a blank previously formed in said blank mold is being subjected to final blowing pressure in said blow mold.

27. In a glass shaping machine, a forming unit for hollow glass articles, comprising a blank mold, a single neck ring cooperating therewith, means for forming a blank in said blank mold including means for compacting a mold charge, a blow mold, means for transferring a blank formed in said blank mold to said blow mold by a relative movement of said neck ring and said blow mold, means for opening said neck ring after it has deposited a blank in said blow mold, means for thereafter causing said neck ring to cooperate with said blank mold when the latter is closed, means for blowing said blank to final form in said blow mold, and timing means for controlling the operation of all the above named means and arranged to control said means so that a blank is being compacted in said blank mold and said neck ring during at least a part of the time the preceding blank is being subjected to final blowing pressure in said blow mold.

28. In a glass shaping machine, a forming unit for hollow glass articles, comprising a blank mold, a single neck ring cooperating therewith, means for forming a blank in said mold and neck ring including means for counterblowing a mold charge in said blank mold, a blow mold, means for transferring a blank formed in said blank mold to said blow mold by a relative movement of said neck ring and said blow mold, means for opening said neck ring after it has deposited a blank in said blow mold, means for thereafter causing said neck ring to cooperate with said blank mold when the latter is closed, means for blowing said blank to final form in said blow mold, and timing means for controlling the operation of all the above named means and arranged to control said means so that a blank is being counterblown in said blank mold and said neck ring during at least a part of the time the preceding blank is subjected to final blowing pressure in said blow mold.

29. In a glass shaping machine, a forming unit for hollow glass articles comprising a blank mold, a single neck ring cooperating therewith, means for forming a blank in said mold and neck ring, a blow mold, means for transferring a blank formed in said blank mold to said blow mold by a relative movement of said neck ring and said blow mold, means for opening said neck ring after it has deposited a blank in said blow mold, means for thereafter causing said neck ring to cooperate with said blank mold when the latter is closed, means for blowing said blank to final form in said blow mold, and timing mechanism for controlling the operation of all the above named means and arranged to control said means so that a blank is supported by said neck ring out of contact with said blank mold, to permit the heat therein to reheat the chilled skin thereof, during at least a portion of the time that a blank previously formed in said blank mold is being subjected to final blowing pressure in said blow mold.

30. In a glass shaping machine, a forming unit for hollow glass articles, comprising a blank mold, means to open and close said blank mold, a single neck ring cooperating with said blank mold, means for forming a blank in said mold and neck ring, a blow mold, means for transferring a blank formed in said blank mold to said blow mold by a relative movement of said neck ring and said blow mold, means for opening said neck ring after it has deposited a blank in said blow mold, means for thereafter causing said neck ring to cooperate with said blank mold when the latter is closed, means for blowing said blank to final form to said blow mold, and timing means for controlling the operation of all the above named means and arranged to control said means so that said blank mold will open to release the blank formed therein during the time that a blank previously formed in the same blank mold is being subjected to final blowing pressure in said blow mold.

31. A method of forming hollow glass articles in a forming unit including a blank mold, a single neck ring, and a blow mold, comprising the steps of forming a blank in said blank mold and said neck ring, transferring the blank thus formed to said blow mold by moving said neck ring from a position in cooperation with said blank mold to a position in cooperation with said blow mold, releasing the blank, returning said neck ring to its initial position in cooperation with said blank mold, and forming the next succeeding blank in said blank mold and said neck ring during at least a part of the time the previously formed blank is being subjected to final blowing pressure in said blow mold.

32. A method of forming hollow glass articles in a forming unit including a blank mold, a single neck ring, and a blow mold, comprising the steps of feeding successive mold charges to said blank mold, forming blanks in said blank mold, transferring the blanks thus formed successively to said blow mold by moving said neck ring from a position in cooperation with said blank mold to a position in cooperation with said blow mold, releasing the blanks, returning said neck ring to its initial position in cooperation with said blank mold, and feeding the next succeeding charge to said blank mold during at least a part of the time the previously formed blank is being subjected to final blowing pressure in said blow mold.

33. A method of forming hollow glass articles in a forming unit including a blank mold, a single neck ring, and a blow mold, comprising the steps of forming a blank in said blank mold including compacting the blank in said mold, transferring the blank thus formed to said blow mold by moving said neck ring from a position in cooperation with said blow mold, releasing the blank, returning said neck ring to its initial position in cooperation with said blank mold, and compacting the next succeeding blank to said blank mold during at least a part of the time the previously formed blank is being subjected to final blowing pressure in said blow mold.

34. A method of forming hollow glass articles in a forming unit including a blank mold, a single neck ring, and a blow mold, comprising the steps of forming a blank in said blank mold and neck ring including the step of counterblowing said blank in said blank mold, transferring the blank thus formed to said blow mold by moving said neck ring from a position in cooperation with said blank mold to a position in cooperation with said blow mold, releasing the blank, returning said neck ring to its initial position in cooperation with said blank mold, and counterblowing the next succeeding blank in said blank mold during at least a part of the time the previously formed blank is being subjected to final blowing pressure in said blow mold.

35. A method of forming hollow glass articles in a forming unit including a blank mold, a single neck ring, and a blow mold, comprising the steps of forming a blank in said blank mold and neck ring, transferring the blank thus formed to said blow mold by moving said neck ring from a position in cooperation with said blank mold to a position in cooperation with said blow mold, releasing the blank, returning said neck ring to its initial position in cooperation with said blank mold, forming the succeeding blank in said blank mold and neck ring, and supporting the blank thus formed out of contact with said blank mold, to permit the heat therein to reheat the chilled skin thereof, during at least a part of the time that a blank previously formed in said blank is being subjected to final blowing pressure in said blow mold.

36. A method of forming hollow glass articles in a forming unit comprising a blank mold, a single neck ring, and a blow mold, comprising the steps of forming a blank in said blank mold and neck ring, transferring the blank thus formed to said blow mold by moving said neck ring from a position in cooperation with said blank mold to a position in cooperation with said blow mold, releasing the blank, returning said neck ring to its initial position in cooperation with said blank mold, and forming the next succeeding blank in said blank mold and opening said blank mold to release said blank both during at least a part of the time the blank previously formed in said blank mold is being subjected to final blowing pressure in said blow mold.

37. A method of forming hollow glass articles in a forming unit including a parison mold, neck forming means and a blow mold, comprising the steps of successively introducing charges of glass into the parison mold, forming said charges successively into parisons in the parison mold, opening the parison mold after the parison forming operations on each charge have been completed to permit the internal heat of the parison to reheat the skin thereof which has been chilled by contact with the mold, successively transferring the parisons thus formed to the blow mold, subjecting the parisons to blowing pressure in the blow mold, and timing the occurrences and durations of the several operations to cause a parison to be subjected to blowing pressure in the blow mold during a period of time overlapping at least in part the time that the next succeeding parison formed in the parison mold for transfer to the same blow mold is being reheated while positioned within the opened parison mold.

38. The method of fabricating glass articles of the narrow neck type, which comprises introducing a first charge of glass into a parison mold and associated neck ring, forming the charge within a selected and predetermined period of time into a parison ready for transfer to a blow mold, transferring such parison to the blow mold by a relative bodily movement of the blow mold and the neck ring, closing the blow mold about the parison so as to support it, opening the neck ring to leave the parison supported by its neck within the blow mold, causing the neck ring again to cooperate with the parison mold when the latter is closed, initiating the application of blowing pressure to the inside of the parison in the blow mold to expand it to the shape of the mold, maintaining the walls of the article within the blow mold in good heat transfer relation therewith by a substantially continuous application of blowing pressure within the article for a period of time sufficient for the transfer of enough heat from the glass article to the blow mold to cause the article to be sufficiently rigid to be self-sustaining at the termination of such application of pressure, thereupon opening the blow mold for the removal of the completely formed and self-sustaining article, introducing a second charge of glass into the parison mold and neck ring simultaneously with a portion of the period of application of blowing pressure to the article within the blow mold and at a time earlier than the next transfer operation by a time equal to the time of formation and preparation of such parison for transfer to the blow mold, and thereafter forming such charge into a parison for transfer to the blow mold during a time period overlapping at least in part the time period during which blowing pressure is maintained within the preceding parison in the blow mold.

39. The method of fabricating glass articles of the narrow neck type, which comprises introducing a first charge of glass into a parison mold and neck mold, forming the charge within a selected and predetermined period of time into a parison ready for transfer to a blow mold including the step of blowing the the parison to hollow form within the parison mold and neck mold, transferring the parison to the blow mold by a relative movement of the neck mold and blow mold, closing the blow mold about the parison so as to support it, thereafter opening the neck mold to release the parison in the closed blow mold, whereby the neck mold may again cooperate with the parison mold for the formation of the next succeeding parison for transfer to the blow mold, initating the application of blowing pressure to the inside of the parison in the blow mold to expand it to the shape of the mold, maintaining the walls of the article within the blow mold in good heat transfer relation therewith by a substantially continuous application of blowing pressure within the article for a period of time sufficient for the transfer of enough heat from the glass article to the blow mold to cause the article to be sufficiently rigid to be self-sustaining at the termination of such application of pressure, thereupon opening the blow mold for the removal of the completely formed and self-sustaining article, introducing a second charge of glass into the parison mold and neck mold simultaneously with a portion of the period of application of blowing pressure to the article within the blow mold and at a time earlier than the next transfer operation by a time equal to the time of formation and preparation of such parison for transfer to the blow mold, and thereafter forming such charge into a parison for transfer to the blow mold in such timed relation that blowing of the second parison to hollow form in the parison mold occurs during a time period overlapping at least in part the time period during which final blowing pressure is maintained within the preceding parison in the blow mold.

Signed at Hartford, Conn., this 11th day of October, 1924.

HENRY W. INGLE.

to the blow mold, and thereafter forming such charge into a parison for transfer to the blow mold in such timed relation that blowing of the second parison to hollow form in the parison mold occurs during a time period overlapping at least in part the time period during which final blowing pressure is maintained within the preceding parison in the blow mold.

Signed at Hartford, Conn., this 11th day of October, 1924.

HENRY W. INGLE.

CERTIFICATE OF CORRECTION.

Patent No. 1,843,160.            Granted February 2, 1932, to

HENRY W. INGLE.

It is hereby certified that error appears in the printed specification of the above numbered patent requiring correction as follows: Page 10, after line 110, insert the following paragraph:-

In some cases, however, it is desirable to leave the glass in the blank mold for a short time only and to transfer the blank to the finishing mold as soon as it acquires a sufficient skin or enamel to permit it to be handled without rupturing. When such a method of operation is employed, a minimum time is required for reheating the blank in the blow mold, and consequently, the finish blow can be applied sooner than where a thicker skin or enamel must be reheated, and the glass takes its final form in the blow mold earlier in the cycle, thus giving more time for the absorption of heat by the blow mold at the proper temperature gradient, and hence producing more ware per mold in a giving time.;

and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.

DISCLAIMER 1,843,160.—*Henry W. Ingle*, Hartford, Conn. GLASS BLOWING MACHINE AND METHOD. Patent dated February 2, 1932. Disclaimer filed August 30, 1932, by the assignee, *Hartford-Empire Company*, patentee, said Ingle, consenting and concurring.

Hereby disclaims each of claims 31, 32, and 33 of said Patent 1,843,160, except when the same be construed to require that the blank mold, single neck ring, and blow mold of the forming unit of each of these claims be mounted and operatively interconnected in such manner that said neck ring is caused to have regularly recurring movements between a position to cooperate with the said blank mold and a position to cooperate with said blow mold.

[*Official Gazette September 20, 1932.*]

CERTIFICATE OF CORRECTION.

Patent No. 1,843,160. Granted February 2, 1932, to

HENRY W. INGLE.

It is hereby certified that error appears in the printed specification of the above numbered patent requiring correction as follows: Page 10, after line 110, insert the following paragraph:-

In some cases, however, it is desirable to leave the glass in the blank mold for a short time only and to transfer the blank to the finishing mold as soon as it acquires a sufficient skin or enamel to permit it to be handled without rupturing. When such a method of operation is employed, a minimum time is required for reheating the blank in the blow mold, and consequently, the finish blow can be applied sooner than where a thicker skin or enamel must be reheated, and the glass takes its final form in the blow mold earlier in the cycle, thus giving more time for the absorption of heat by the blow mold at the proper temperature gradient, and hence producing more ware per mold in a giving time.;

and that the said Letters Patent should be read with this correction therein that the same may conform to the record of the case in the Patent Office.
Signed and sealed this 22nd day of March, A. D. 1932.

(Seal)

M. J. Moore,
Acting Commissioner of Patents.

DISCLAIMER 1,843,160.—*Henry W. Ingle*, Hartford, Conn. GLASS BLOWING MACHINE AND METHOD. Patent dated February 2, 1932. Disclaimer filed August 30, 1932, by the assignee, *Hartford-Empire Company*, patentee, said Ingle, consenting and concurring.

Hereby disclaims each of claims 31, 32, and 33 of said Patent 1,843,160, except when the same be construed to require that the blank mold, single neck ring, and blow mold of the forming unit of each of these claims be mounted and operatively interconnected in such manner that said neck ring is caused to have regularly recurring movements between a position to cooperate with the said blank mold and a position to cooperate with said blow mold.

[*Official Gazette September 20, 1932.*]